J. E. VAN ORDEN.
SELF LOCKING NUT.
APPLICATION FILED JULY 7, 1916.

1,251,141.

Patented Dec. 25, 1917.

James E. Van Orden,
Inventor

By Geo. Kimmel
Attorney

UNITED STATES PATENT OFFICE.

JAMES E. VAN ORDEN, OF SOUTH DURHAM, NEW YORK.

SELF-LOCKING NUT.

1,251,141.  Specification of Letters Patent.  Patented Dec. 25, 1917.

Application filed July 7, 1916.  Serial No. 107,957.

*To all whom it may concern:*

Be it known that I, JAMES E. VAN ORDEN, a citizen of the United States, and resident of South Durham, in the county of Greene and State of New York, have invented certain new and useful Improvements in Self-Locking Nuts, of which the following is a specification.

The present invention relates to nut and bolt locks and has particular reference to new and useful improvements in base-clutch pawl locked nuts.

The primary object of my invention is to provide an improved nut having a novel arrangement of spring locking tongues struck therefrom, said tongues extending from the base of the nut for engagement with an object to be held by the nut, whereby to prevent reverse rotation of the nut.

Another object of my invention is to provide a nut of the class described having spring locking tongues formed on the base thereof, said tongues extending oppositely and connecting with the nut at points approximately diametrically opposite on either side of the bore of the nut for enhancing the efficiency of such locking devices.

A further object of my invention is to provide a nut of the class described which is simple in construction, cheaply constructed, and effective in operation.

Figure 1:
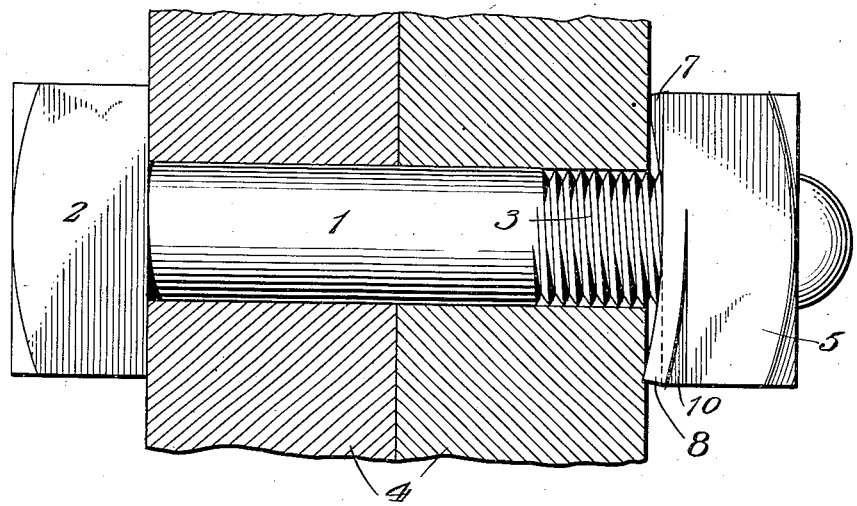
Figure 2:
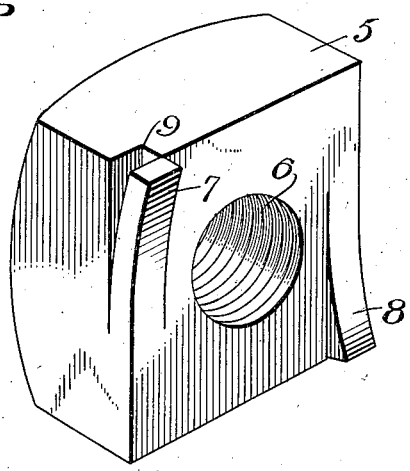

Other objects and advantages to be derived from the use of my improved locking nut will appear from the following detail description and the claim, taken with an inspection of the accompanying drawing, in which:

Figure 1 is a side elevational view of a bolt and a nut, the latter embodying the improvements of my invention, and being shown in use; and Fig. 2 is an enlarged perspective view of the nut embodying the improvements of my invention.

Referring more particularly to the drawing, wherein similar characters of reference designate like and corresponding parts throughout the various views, 1 designates the bolt having a head 2 on one end thereof and a threaded portion 3 on the opposite end thereof. Objects to be held are designated 4.

The nut of my invention is designated 5 in its entirety having the usual threaded bore 6.

The locking elements of my invention include outwardly curved spring tongues 7 and 8, said tongues being struck from the base edges of the nut 5, longitudinal incisions from opposite sides of the nut along said edges being formed. The longitudinal incisions form recesses, said recesses being designated 9 and 10.

Upon reference to Fig. 2 is will be noted that the inner ends of the spring locking tongues 7 and 8 are located at points approximately diametrically opposite with relation to the bore 6. This arrangement enhances the efficiency of the locking tongues and also simplifies the construction and cheapens the manufacture. This also permits the provision of a locking tongue of equal thickness throughout its length which prevents the chipping of the free end of the spring tongue which often occurs with the devices now in use. Attention is also directed to the tangential arrangement of the tongues relative the bore of the nut, a secure biting action being obtained by this arrangement.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

A device of the class described including a nut having a flat sided body portion, said body portion having longitudinally extending incisions in two opposite side walls and the bearing face of the nut, extending from diagonally opposite ends to approximately half across said nut and disposed adjacent and parallel with the lower edges thereof, and said incisions communicating thereby forming spring tongues that are adapted to be bent outwardly from the bearing face of the nut.

In testimony whereof, I affix my signature hereto.

JAMES E. VAN ORDEN.